Patented Nov. 21, 1933

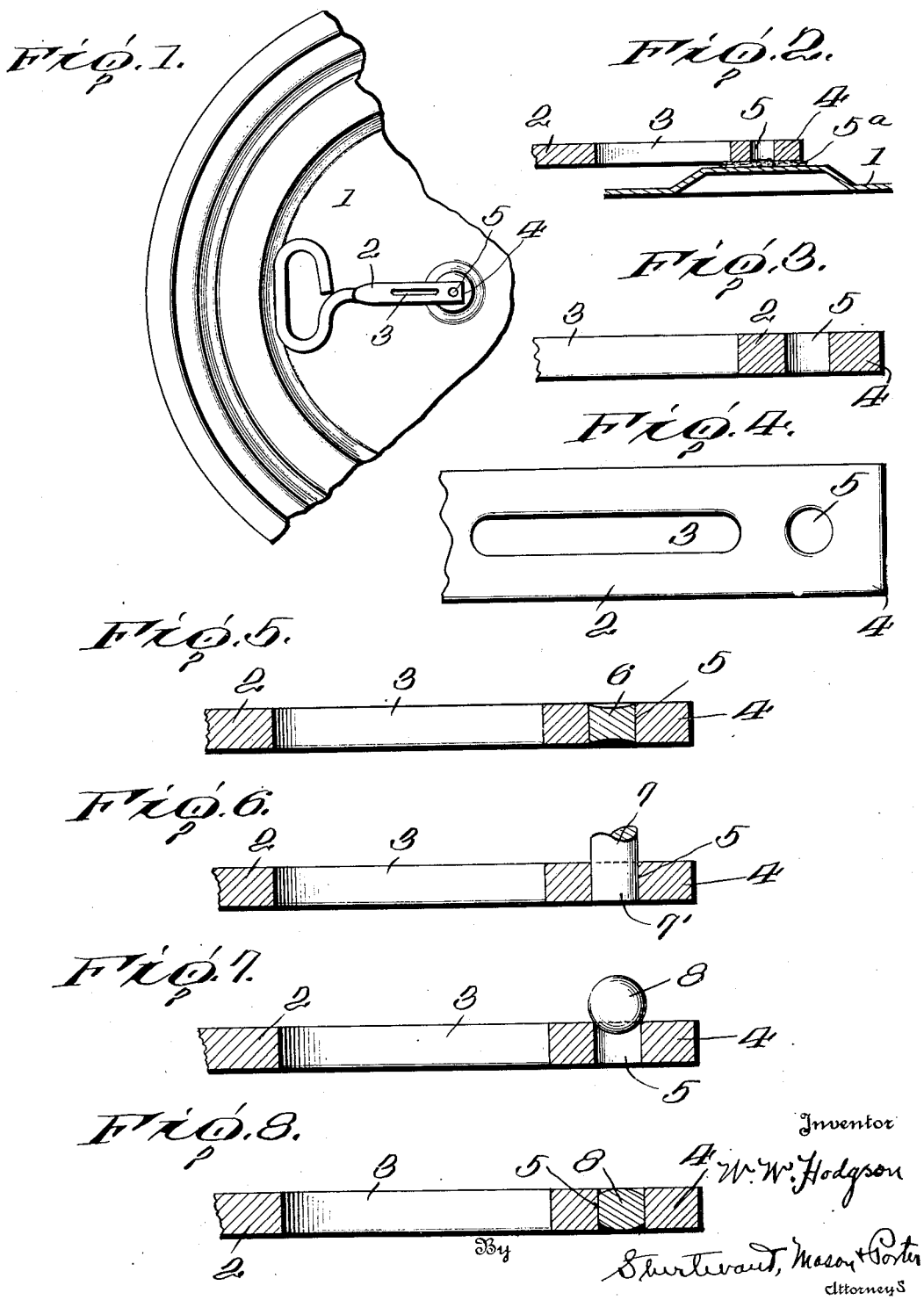

1,936,018

UNITED STATES PATENT OFFICE 1,936,018

METHOD OF ATTACHING KEYS TO CONTAINERS

William W. Hodgson, Chicago, Ill., assignor to Continental Can Company, Inc., New York, N. Y., a corporation of New York Application March 20, 1931. Serial No. 524,190

2 Claims. (Cl. 113—112)

The invention relates to new and useful improvements in the method of attaching keys to containers of the rip strip type.

An object of the invention is to provide a method of solder bonding a key to a container end whereby a predetermined amount of solder may be used and applied substantially within the region where the bonding of the key to the container end can be effected.

A further object of the invention is to provide a method of solder bonding keys to containers wherein a predetermined amount of solder is placed in a pocket in the key so as to be retained therein, thus permitting the key to be attached to the container end when placed thereon solely by the aid of heat, melting the solder in the pocket in the key and causing the same to flow into bonding relation with the key and container end.

In the drawing—

Figure 1 is a plan view showing the key attached to a container end by my improved method;

Fig. 2 is a sectional view through a portion of the key and container end on a larger scale;

Fig. 3 is a sectional view through the end of the key, showing the formed pocket therein in which the solder is to be placed;

Fig. 4 is a plan view of the same;

Fig. 5 is a view showing the pocket or opening in the key as filled with solder by the dipping of the key in molten solder;

Fig. 6 is a sectional view showing the pocket as substantially filled with solder by forcing a solder rod into the pocket preparatory to the severing of the solder rod at the surface of the key;

Fig. 7 is a view showing a spherical solder drop placed on a key preparatory to the forcing of the same into the pocket, and Fig. 8 is a similar view, but showing the solder drop as forced into the pocket.

It is a very common expedient in the container art to provide the wall of the body of the container with score lines and with a projecting portion which may be wound on to a key for tearing away part of the body between the score line for releasing the end of the container from the body thereof. It has also been a common expedient to provide means for attaching the key to the container end so that it may be readily loosened therefrom and used for removing the rip strip. The key has been secured to the container end by welding and by soldering. The present method has to do with the soldering of a key to a container end. By the methods heretofore employed, there is no way of determining the amount of solder used, nor the restricting of the solder bond substantially to the region where the key makes contact with the end, and as a result, the solder bond is often unsightly, and also the amount of solder used is excessive.

By my improved method, a predetermined amount of solder is used in each instance, and the solder is attached to the key so as to become a unit therewith, and is so attached thereto, in the preferred form of the invention that no flux is necessary, which often results in a rusting of the key parts with which it contacts when the keys are not attached to the container for some time after the solder has been applied thereto. In carrying out the invention, I provide the key preferably in the region adjacent the slotted end thereof with a pocket. This pocket may be made of any desired shape. It may be in the form of a recess, or an opening extending all the way through the key. In the pocket is placed a predetermined quantity of solder. This solder may be applied to the key in various ways. In one form of the invention, the key is dipped into a solder bath and the pocket thus filled with solder, which, when cooled, becomes firmly attached to the key and may be handled as a unit with the key. In another form of the invention, an opening is made all the way through the key, and a solder rod of sufficient diameter to be firmly gripped by the walls of the opening is forced into the opening and then cut so as to leave a plug or lump of solder frictionally retained in the opening of a predetermined size. This, of course, is determined by the size of the opening. In another form of the invention, the solder is first made into a substantially spherical solder drop, such as a shot. This solder drop is of sufficient diameter so as to rest in the opening formed in the key, but it does not enter the opening until force is applied for forcing the solder drop into the opening. The solder is soft and will yield, so that when the solder drop is forced into the opening, it will firmly grip the walls of the opening and be retained therein.

Referring more in detail to the drawing, Fig. 1 shows a container end 1 to which a key 2 has been applied by my improved method. The key is provided with a slot 3 of the usual character, which slot is placed over the end of the rip strip, and then by turning the key, the rip strip is wound thereon and torn from the body of the container. The key 2 at the end 4 thereof is provided with an opening 5, which as shown in Figures 3 and 4, extends all the way through the key. In all of the different forms of the invention, I have shown for the purpose of illustration only, an opening extending all the way through the key, which opening is substantially circular in cross section and cylindrical in contour. This opening forms a pocket in which the solder to be used in bonding the key to the container end is stored. It will be understood that the pocket may be of any shape. It may be in the form of a recess in one face only of the key, and there may be several pockets, if desired. The pockets are proportioned so that when they are filled with solder, just the proper amount of solder for bonding the key to the container end in the most efficient manner is contained in the pocket. There are various ways in which this pocket may be filled substantially full of solder. One of the ways as illustrated in Fig. 5, consists in passing the tip end of the key with the pocket 5 formed therein through a solder bath. The pocket will be filled with solder, which, when cooled, will form a slug of solder indicated at 6 in Fig. 5. This slug of solder is housed within the pocket, and does not collect on either face of the key.

In Fig. 6 of the drawing, a different method is illustrated of filling the pocket with solder. In this form of the invention, a solder rod 7 is made, which in diameter, is slightly greater than the diameter of the cylindrical pocket in the key. The rod is forced into the pocket, and is then cut off at one side or at both sides of the key, so as to form a solder slug 7' which fills the pocket. In the form of the invention shown in Figures 7 and 8, the solder is formed into a spherical drop as indicated at 8. This may be formed in the ordinary way of forming shot. The diameter of the spherical solder lump is slightly greater than the diameter of the cylindrical opening 5 in the end of the key. The solder drop may be supported on the key and will rest in the opening as shown in Fig. 7. It is then placed in a machine where pressure may be applied to the solder drop for forcing the same into the pocket to the position shown in Fig. 8. The solder is sufficiently soft so as to permit the forcing of the spherical solder drop into the cylindrical pocket, and when forced therein it will substantially conform to the shape of the pocket and will grip tie walls of the pocket so as to be firmly retained therein. In all of the forms of the invention, a predetermined amount of solder is placed in the pocket in the key and is substantially housed within the key so that both faces of the key are free from solder. The key is then placed on the container end. It may be placed on the container end either side up, if the opening extends all the way through the key, as shown in the drawing. Heat is applied to the solder after the key has been placed on the end, and the solder will melt and flow from the pocket into bonding relation with the key and container end, as indicated at 5ª in Fig. 2 of the drawing. Practically all of the solder will be retained beneath the key, so that little or no solder will appear on the end outside of the region of the key. This makes a very efficient bonding of the key to the container end by the use of a minimum amount of solder. It also makes a bonding which is substantially concealed by the body of the key. When the solder is attached to the key through the frictional gripping of the solder on the walls of the pocket, no fluxing is necessary, and therefore, there is no flux on the key which is liable to cause oxidation and rust if the key stands for some time before it is attached to the end.

It is obvious that minor changes may be made in the shaping of the pocket, also in the forming of the solder lump, and the attaching of the same to the key. The essential feature of the invention resides in the applying of a predetermined amount of solder to the key, so that it may be housed within the key walls and retained therein so that the key may be handled as a unit in the applying of the key to the container end.

Having thus described the invention, what I claim as new and desire to secure by Letters Patent, is—

1. The method of attaching a key to container ends consisting in forming said key with a solder retaining pocket, securing within said pocket a predetermined amount of solder, placing the key on the container end with the pocket facing the same and applying heat to the solder for causing all of the solder to flow from the pocket into bonding relation between the key and the container end.

2. The method of attaching a key having a flat end to container ends, consisting in forming said end portion with a pocket for solder, which flat end is located in said flat face away from the side edges and the end of the key, filling said pocket with solder, placing the key on the container end with the pocket facing the container end, applying heat to the solder for causing the same to flow from the pocket into bonding relation between the key and the container end, said pocket being dimensioned so that the solder bond produced by the melting of the solder is confined substantially within the limits of the key and concealed thereby.

WILLIAM W. HODGSON.